US012342444B2

(12) United States Patent
Jeong et al.

(10) Patent No.: US 12,342,444 B2
(45) Date of Patent: Jun. 24, 2025

(54) INDUCTION HEATING APPARATUS AND METHOD FOR CONTROLLING THE SAME

(71) Applicant: LG ELECTRONICS INC., Seoul (KR)

(72) Inventors: Sihoon Jeong, Seoul (KR); Bada Yoon, Seoul (KR); Wongyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 759 days.

(21) Appl. No.: 17/569,892

(22) Filed: Jan. 6, 2022

(65) Prior Publication Data

US 2022/0217819 A1 Jul. 7, 2022

(30) Foreign Application Priority Data

Jan. 7, 2021 (KR) ........................ 10-2021-0002155

(51) Int. Cl.
*H05B 6/06* (2006.01)
*H05B 6/12* (2006.01)

(52) U.S. Cl.
CPC ............... *H05B 6/062* (2013.01); *H05B 6/12* (2013.01)

(58) Field of Classification Search
CPC .......... H05B 6/062; H05B 6/12; H05B 6/065; H05B 6/04; H05B 6/1245; H05B 2213/03; H02M 7/44
See application file for complete search history.

(56) References Cited

U.S. PATENT DOCUMENTS

| | | | | |
|---|---|---|---|---|
| 10,136,476 | B2 | 11/2018 | Uchida | |
| 2019/0124726 | A1* | 4/2019 | Moon | H05B 6/065 |
| 2020/0374988 | A1* | 11/2020 | Park | H05B 6/062 |
| 2021/0195698 | A1* | 6/2021 | Moon | H05B 6/1236 |
| 2021/0274607 | A1* | 9/2021 | Seong | H05B 6/1236 |

FOREIGN PATENT DOCUMENTS

| | | |
|---|---|---|
| EP | 1 635 614 A2 | 3/2006 |
| EP | 2 618 633 A1 | 7/2013 |
| KR | 10-2020-0025546 | 3/2020 |
| WO | WO 2020/046052 A1 | 3/2020 |

OTHER PUBLICATIONS

Extended European Search Report dated Jun. 7, 2022 issued in Application 2215j0545.6.

Korean Office Action dated Mar. 11, 2025, issued in Application No. 10-2021-0002155.

* cited by examiner

*Primary Examiner* — John P. Dulka
(74) *Attorney, Agent, or Firm* — KED & ASSOCIATES, LLP

(57) ABSTRACT

A controller of the induction heating apparatus in one embodiment may determine an overlapped period of a resonance current value of a working coil and a driving voltage value of a switching element included in an inverter circuit. The overlapped period may denote a period for which the resonance current value and the driving voltage value are all positive numbers. The controller may determine whether a driving state of the induction heating apparatus is normal or abnormal based on a time point at which the overlapped period appears. When determining that the driving state of the induction heating apparatus is abnormal, the controller may stop driving of the working coil.

20 Claims, 9 Drawing Sheets

INDUCTION HEATING APPARATUS AND METHOD FOR CONTROLLING THE SAME

CROSS-REFERENCE TO RELATED APPLICATION

This application claims priority to and the benefit of Korean Patent Application No. 10-2021-0002155, filed in Korea on Jan. 7, 2021, the disclosure of which is incorporated herein by reference in its entirety.

BACKGROUND

1. Field

Disclosed herein are an induction heating apparatus and a method for controlling the same.

2. Background

Induction heating apparatuses are devices that generate eddy current in a metallic container and heat the container, using a magnetic field generated around a working coil. When an induction heating apparatus is driven, high-frequency current is supplied to the working coil. Then, an induced magnetic field is generated around the working coil disposed in the induction heating apparatus. When magnetic line of force of the induced magnetic field generated passes through a bottom of the metallic container over the working coil, eddy current is generated inside the bottom of the container. Accordingly, the eddy current generated flows in the container, and the container itself is heated.

FIG. 1 is a view showing a state in which a container is abnormally placed in a heating zone formed on an upper plate of an induction heating apparatus, and FIG. 2 is a view showing a state in which a container is normally placed in a heating zone formed on an upper plate of an induction heating apparatus.

The induction heating apparatus includes a heating zone in which a container is placed. For example, the heating zone is formed on an upper plate 30 of the induction heating apparatus, and the heating zone corresponds to a working coil 32, as illustrated in FIGS. 1 and 2. That is, the heating zone is formed in a zone corresponding to a position of the working coil 32.

When a user places the container 34 on the upper plate 30, sets a power level of the heating zone, and then inputs an instruction to initiate heating, the working coil 32 operates, to heat the container.

When the container 34 is placed on the upper plate 30, heating performance of the working coil 32 may vary depending on a distance between a center point A1 of the working coil 32 and a center point A2 of the container 34. For example, when the container 34 is heated, as the center point A1 of the working coil 32 becomes farther from the center point A2 of the container 34 as illustrated in FIG. 1, the heating performance of the working coil 32 deteriorates. Thus, it takes a long time to heat the container 34. When the center point A1 of the working coil 32 is spaced from the center point A2 of the container 34 as illustrated in FIG. 1, the container is in a state of being eccentric.

When the center point A1 of the working coil 32 completely matches the center point A2 of the container 34 as illustrated in FIG. 2, the heating performance of the working coil 32 is maximized. Thus, time taken to heat the container 34 is minimized. When the center point A1 of the working coil 32 matches the center point A2 of the container 34 as illustrated in FIG. 2, the container is in a state of being concentric.

FIG. 3 is a view showing frequency-output power value curves when a container is placed in a heating zone abnormally and normally.

In FIG. 3, a curve 301 shows output power values of the working coil 32, corresponding to driving frequencies of the working coil 32, when the container 34 is in the state of being eccentric as illustrated in FIG. 1. In FIG. 3, a curve 302 shows output power values of the working coil 32, corresponding to driving frequencies of the working coil 32, when the container 34 is in the state of being concentric as illustrated in FIG. 2. As illustrated in FIG. 3, a resonance frequency of the working coil 32 when the container 34 is in the state of being eccentric are less than a resonance frequency of the working coil 32 when the container 34 is in the state of being concentric.

In each of the frequency-output power value curves 301, 302 of FIG. 3, a left area, i.e., an area in which frequencies are less than the resonance frequencies F1, F2, is referred to as capacitive areas CA1, CA2, with respect to the resonance frequencies F1, F2, and a right area, i.e., an area in which frequencies are greater than the resonance frequencies F1, F2, is referred to as inductive areas IA1, IA2, with respect to the resonance frequencies F1, F2.

When a driving frequency of the working coil 32 is set to a frequency included in the inductive areas IA1, IA2 in a state in which the resonance frequencies F1, F2 of the working coil 32 are fixed, the induction heating apparatus operates normally.

When a driving frequency of the working coil 32 is set to a frequency included in the capacitive areas CA1, CA2 in a state in which the resonance frequencies F1, F2 of the working coil 32 are fixed, the induction heating apparatus operates abnormally. Specifically, when the working coil 32 operates in the capacitive areas CA1, CA2, zero voltage switching (ZVS) of switching elements included in an inverter circuit configured to supply current to the working coil 32 fails. Thus, switching loss among the switching elements increases, and power efficiency of the inverter circuit and the working coil 32 decrease. Further, as the switching loss among the switching elements increases due to the failure of ZVS, the switching elements may be damaged due to heat generation of the switching elements.

When the user inputs a power level and an instruction to initiate heating in the state in which the container 34 is in the state of being eccentric as illustrated in FIG. 1, a resonance frequency F1 of the working coil 32 is determined, and a driving frequency FL of the working coil 32 is determined based on an output power value corresponding to the power level input by the user. Accordingly, the working coil 32 may be driven at the driving frequency FL. In this case, since the driving frequency FL of the working coil 32 is greater than the resonance frequency F1, the induction heating apparatus operates in the inductive area IA1.

By the way, when the user moves the container 34 to a different position such that the container 34 is in the state of being concentric as illustrated in FIG. 2, while the working coil 32 operates at the driving frequency FL in the state in which the container 34 is in the state of being eccentric as illustrated in FIG. 1, the driving frequency FL of the working coil 32 remains the same, and the resonance frequency the working coil 32 changes from F1 to F2. As a result, the driving frequency FL of the working coil 32 becomes less than the resonance frequency F2, and the induction heating apparatus operates in the capacitive area CA2. Thus, as switching loss of the switching elements included in the inverter circuit increases, the switching elements can be burned out.

SUMMARY

The objective of the present disclosure is to provide an induction heating apparatus and a method for operating the same, which prevent a switching element from being burnt out.

It is an objective of the present disclosure to provide an induction heating apparatus and a method for operating the same, which adapt the driving frequencies, when moving the container during operation of the working coil.

This is in particular achieved by stopping operation of an induction heating apparatus when the induction heating apparatus is sensed operating abnormally due to a change in the position of a container during normal operation of the induction heating apparatus.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

The object is solved by the features of the independent claims. Preferred embodiments are given in the dependent claims.

In one aspect of the disclosure, an induction heating apparatus, is provided comprising: a working coil disposed in a position corresponding to a position of a heating zone; an inverter circuit comprising a plurality of switching elements and configured to supply current to the working coil; a driving circuit configured to supply a switching signal to each of the switching elements included in the inverter circuit; and a controller configured to determine a driving frequency of the working coil, corresponding to a power level of the heating zone, when the power level is input, supply a control signal based on the driving frequency to the driving circuit, and drive the working coil.

Preferably, the controller may measure a resonance current value of the working coil, may measure a driving voltage value supplied to a switching element included in the inverter circuit configured to supply current to the working coil.

The controller may measure a resonance current value of the working coil and measure a driving voltage value supplied to a switching element and may determine whether the induction heating apparatus is driven in abnormal or normal and may control driving of the working coil based on thereon.

Operating the induction heating apparatus with driving frequencies less than a resonance frequency may represent a capacitive area and operating the induction heating apparatus with driving frequencies greater than the resonance frequency may represent an inductive area.

The controller may determine or generate an overlapped period of the resonance current value and the driving voltage value, may compare a time point of appearance of the overlapped period with a predetermined reference time point to thereby determine a driving state of the induction heating apparatus, and may control driving of the working coil based on the driving state of the induction heating apparatus.

In one or more embodiments, the overlapped period may be a period for which the resonance current value and the driving voltage value are all positive numbers.

In one or more embodiments, the diving voltage value may be magnitude of voltage supplied between a second terminal and a third terminal of the switching element.

In one or more embodiments, the reference time point may be a middle time point of a period for which the resonance current value is positive numbers.

In one or more embodiments, when the time point at which the overlapped period appears is later than the reference time point, the controller may determine that the driving state of the induction heating apparatus is normal.

When the time point at which the overlapped period appears is earlier than the reference time point, the controller may determine that the driving state of the induction heating apparatus is abnormal.

In one or more embodiments, when determining that the driving state of the induction heating apparatus is normal, the controller may keep the working coil operating.

When determining that the driving state of the induction heating apparatus is abnormal, the controller may stop driving of the working coil.

In one or more embodiments, the controller may determine a re-driving frequency of the working coil, corresponding to the power level after the working coil stops operating, and may drive the working coil based on the re-driving frequency.

In another aspect a method for controlling an induction heating apparatus is provided, comprising: receiving an input power level of a heating zone; determining a driving frequency of a working coil, corresponding to the power level; driving the working coil based on the driving frequency; measuring a resonance current value of the working coil; measuring a driving voltage value supplied to a switching element included in an inverter circuit configured to supply current to the working coil; determine whether the driving state of the induction heating apparatus is normal or abnormal based on the measured resonance current value of the working coil and the measured a driving voltage.

The determining of the driving state may include determining an overlapped period of the resonance current value and the driving voltage value; comparing a time point at which the overlapped period appears with a predetermined reference time point to determine a driving state of the induction heating apparatus; and controlling driving of the working coil based on the driving state of the induction heating apparatus.

In one or more embodiments, determining a driving state of the induction heating apparatus may comprise: determining that the driving state of the induction heating apparatus is normal when the time point at which the overlapped period appears is later than the reference time point; and determining that the driving state of the induction heating apparatus is abnormal when the time point at which the overlapped period appears is earlier than the reference time point.

In one or more embodiments, controlling driving of the working coil, may comprise: keeping the working coil operating when determining that the driving state of the induction heating apparatus is normal; and stopping driving of the working coil when determining that the driving state of the induction heating apparatus is abnormal.

In one or more embodiments, controlling driving of the working coil, may further comprise: determining a re-driving frequency of the working coil, corresponding to the power level, after the working coil stops operating; and driving the working coil based on the re-driving frequency. A controller of an induction heating apparatus in one embodiment may generate an overlapped period of a resonance current value of a working coil, and a driving voltage value of a switching element included in an inverter circuit. In the present disclosure, the overlapped period may be a period for which the resonance current value and the driving voltage value are all positive numbers.

The controller may determine whether a driving state of the induction heating apparatus is abnormal, based on a time point of appearance of the overlapped period.

In the disclosure, the abnormal driving state of the induction heating apparatus denotes driving of the induction heating apparatus in a capacitive area. Additionally, in the disclosure, the normal driving state of the induction heating apparatus denotes driving of the induction heating apparatus in an inductive area.

When determining that the driving state of the induction heating apparatus is abnormal, the controller may stop the driving of the working coil. When the induction heating apparatus operates in the capacitive area, the switching element is likely to be burnt out. The driving of the working coil may be stopped to prevent the switching element from being burnt out.

The induction heating apparatus in one embodiment may include a working coil disposed in a position corresponding to a position of a heating zone, an inverter circuit including a plurality of switching elements and configured to supply current to the working coil, a driving circuit configured to supply a switching signal to each of the switching elements included in the inverter circuit, and a controller configured to determine a driving frequency of the working coil, corresponding to a power level of the heating zone, when the power level is input, supply a control signal based on the driving frequency to the driving circuit, and drive the working coil.

In one embodiment, the controller may measure a resonance current value of the working coil, measure a driving voltage value supplied to the switching element included in the inverter circuit configured to supply current to the working coil, generate an overlapped period of the resonance current and the driving voltage, compare a time point of appearance of the overlapped period with a predetermine reference time point to determine a driving state of the induction heating apparatus, and control driving of the working coil based on the driving state of the induction heating apparatus.

A method for controlling an induction heating apparatus in one embodiment may include receiving an input power level of a heating zone, determining a driving frequency of a working coil, corresponding to the power level, driving the working coil based on the driving frequency, measuring a resonance current value of the working coil, measuring a driving voltage value supplied to a switching element included in an inverter circuit configured to supply current to the working coil, generating an overlapped period of the resonance current and the driving voltage, comparing a time point of appearance of the overlapped period with a predetermined reference time point to determine a driving state of the induction heating apparatus, and controlling driving of the working coil based on the driving state of the induction heating apparatus.

In one embodiment, when an induction heating apparatus is sensed operate abnormally due to a change in the position of a container during normal operation of the induction heating apparatus, the induction heating apparatus stops operating. Thus, the burning out of switching elements are prevented, which would be caused when the induction heating apparatus continues to operate abnormally.

BRIEF DESCRIPTION OF THE DRAWINGS

Embodiments will be described in detail with reference to the following drawings in which like reference numerals refer to like elements, and wherein.

DETAILED DESCRIPTION

Figure 1:
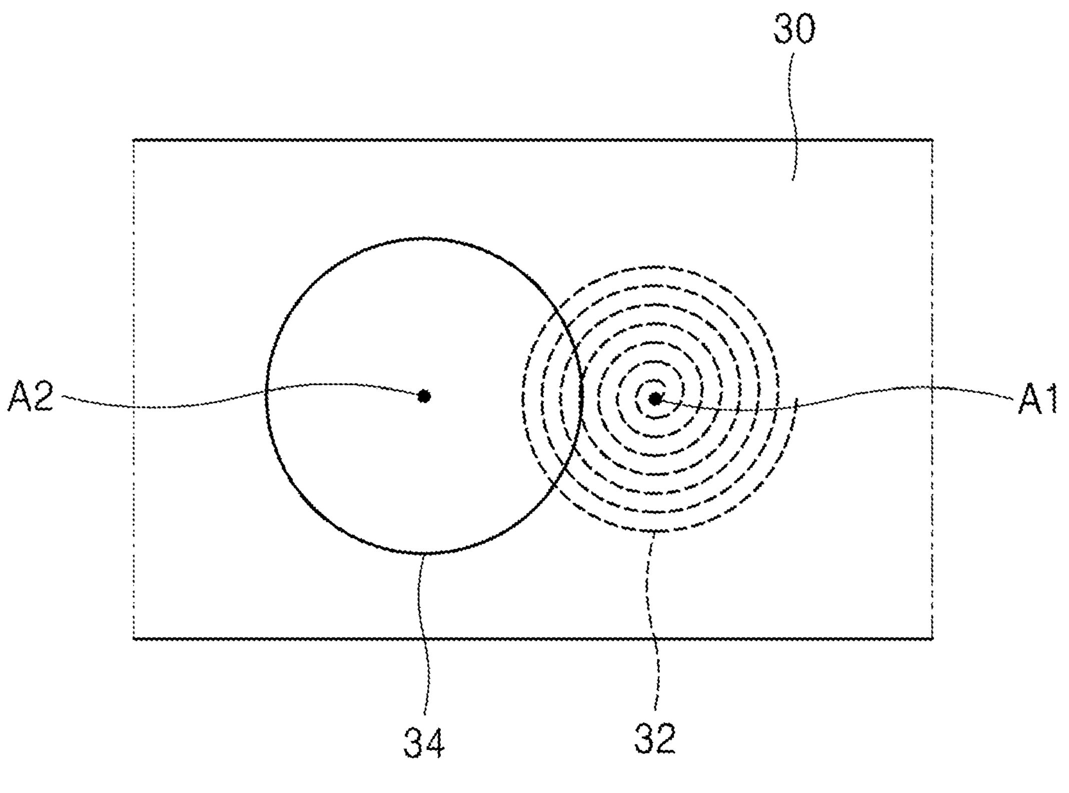
FIG. 1 is a view showing a state in which a container is abnormally placed in a heating zone formed on an upper plate of an induction heating apparatus.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 4:
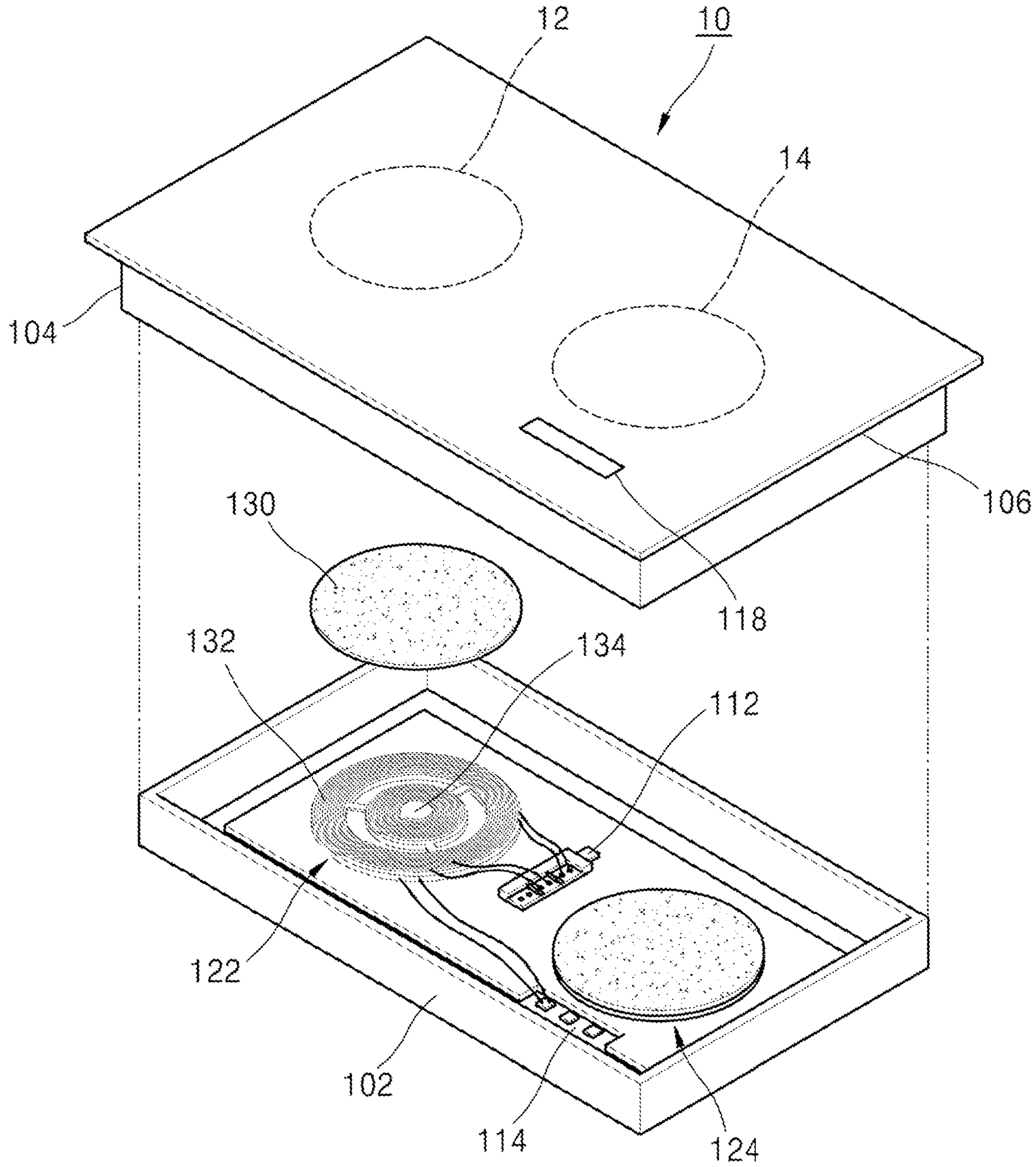
FIG. 4 is an exploded perspective view showing an induction heating apparatus in one embodiment.

FIG. 4 is an exploded perspective view showing an induction heating apparatus in one embodiment.

Referring to FIG. 4, an induction heating apparatus 10 in one embodiment may include a case 102 constituting a main body, and a cover plate 104 coupled to the case 102 and sealing the case 102.

The cover plate 104 may be coupled to an upper surface of the case 102 and seal a space, formed inside the case 102, from the outside. The cover plate 104 may include an upper plate 106 on which a container for cooking a food item is placed. In one embodiment, the upper plate 106 may be made of tempered glass such as ceramic glass. However, a material for the upper plate 106 may vary depending on embodiments.

Heating zones 12, 14 respectively corresponding to working coil assemblies 122, 124 may be formed on the upper plate 106. For a user to recognize positions of the heating zones 12, 14 easily, lines or figures corresponding to the heating zones 12, 14 may be printed or displayed on the upper plate 106.

The case 102 may be formed as a cuboid, an upper portion of which is open. The working coil assemblies 122, 124 for heating a container may be disposed in the space formed inside the case 102. Additionally, an interface 114 may be disposed inside the case 102. The interface 114 may allow the user to input a desired supply power or be used to adjust a power level of each of the heating zones 12, 14. The interface may further display information on the induction heating apparatus 10. However, such information may be also displayed at a different position. The interface 114 may be implemented as a touch panel that is capable of inputting based on a touch input at the touch panel and/or displaying information. However, an interface 114 having a different structure may be used depending on embodiments.

Additionally, on the upper plate 106, a manipulation zone 118 may be disposed in a position corresponding to a position of the interface 114. For the user's manipulation, characters or images and the like may be printed in the manipulation zone 118, in advance. The user may perform desired manipulation by touching a specific point of the manipulation zone 118 with reference to the characters or images that are printed in the manipulation zone 118 in advance. Additionally, information output by the interface 114 may be displayed through the manipulation zone 118.

The user may set a power level of each of the heating zones 12, 14 through the interface 114. The power level may be displayed in the manipulation zone 118 as numbers (e.g., 1, 2, 3, . . . , 9). When a power level of each of the heating zones 12, 14 is set, a required power value and a driving frequency of a working coil corresponding to each of the heating zones 12, 14 may be determined. A controller may drive each working coil, based on the determined driving frequency, such that an actual output power value of each working coil matches a required power value set by the user.

Further, a power supply 112 for supplying power to the working coil assemblies 122, 124 or the interface 114 may be disposed in the space formed inside the case 1.

In the embodiment of FIG. 4, two working coil assemblies, i.e., a first working coil assembly 122 and a second working coil assembly 124, are disposed inside the case 102, for example. However, three or more working coil assemblies may be disposed inside the case 102, depending on embodiments.

The working coil assemblies 122, 124 may include a working coil that forms an induced magnetic field using a high-frequency alternating current supplied by the power supply unit 112, and an insulating sheet for protecting a coil from heat generated by a working coil forming an induced magnetic field. In FIG. 4, the first working coil assembly 122 may include a first working coil 132 for heating a container placed in a first heating zone 12, and a first insulating sheet 130, for example. Additionally, though not illustrated, the second working coil assembly 124 may include a second working coil and a second insulating sheet. Depending on embodiments, the insulating sheet may not be provided.

Further, each of the working coils may be provided with a temperature sensor, in a central portion thereof. In FIG. 4, a temperature sensor 134 may be disposed in a central portion of the first working coil 132, for example. The temperature sensor may measure a temperature of a container placed in each of the heating zones. In one embodiment, the temperature sensor may be a thermistor temperature sensor having a variable resistance whose resistance value changes according to the temperature of the container, but the type of the temperature sensor is not limited thereto.

In one embodiment, the temperature sensor may output a sensing voltage corresponding to a temperature of a container, and the sensing voltage output from the temperature sensor may be delivered to the controller. The controller may determine the temperature of the container, based on magnitude of the sensing voltage output from the temperature sensor, and when the temperature of the container is a predetermined reference value or greater, may perform an overheat preventing operation by decreasing an actual power value of a working coil or stopping driving of a working coil.

Furthermore, though not illustrated in FIG. 4, a substrate may be disposed in the space formed inside the case 102, and a plurality of circuits or elements including the controller may be mounted onto the substrate. The controller may drive each of the working coils according to the user's instruction to initiate heating, input through the interface 114, to perform a heating operation. When the user inputs an instruction to end heating through the interface 114, the controller may stop the driving of the working coils to end the heating operation.

Figure 5:
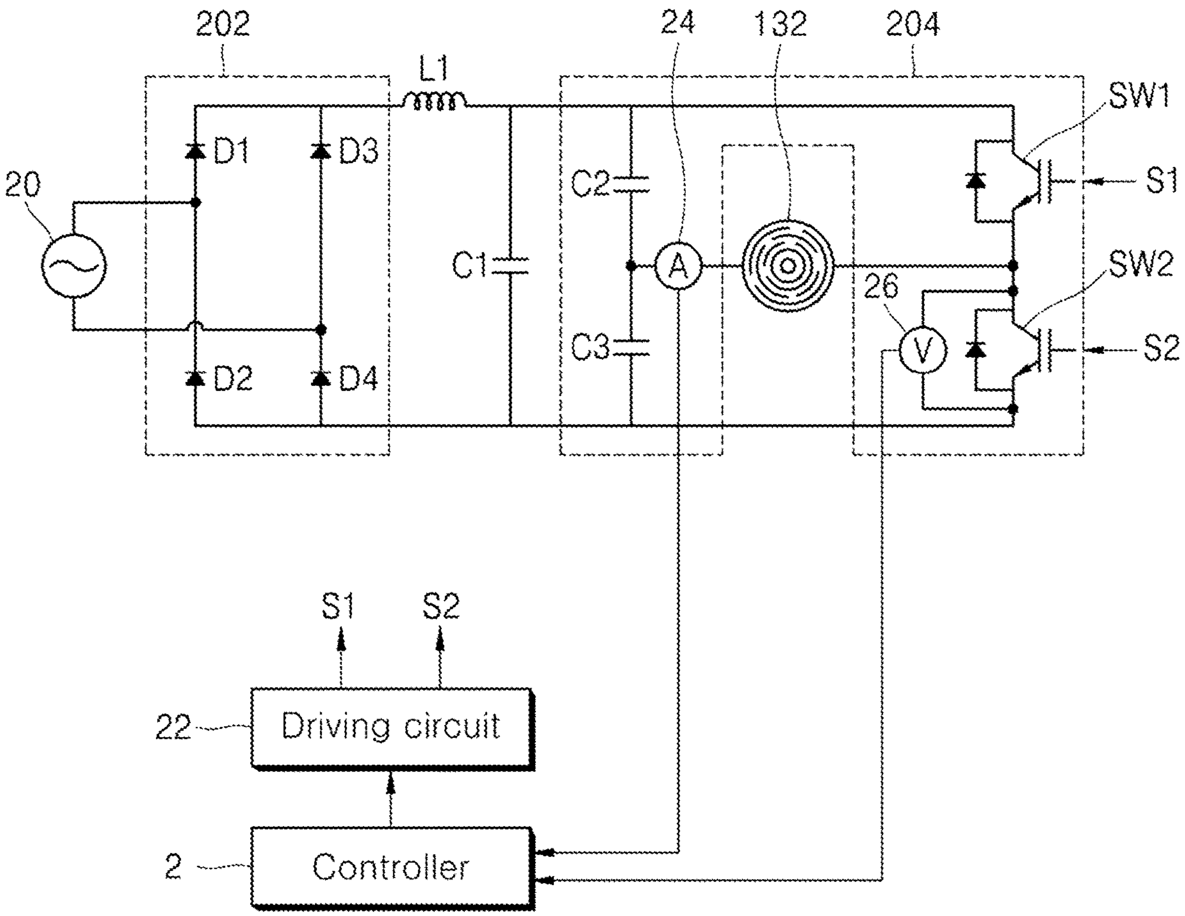
FIG. 5 is a circuit diagram of the induction heating apparatus in one embodiment.

FIG. 5 is a circuit diagram of the induction heating apparatus in one embodiment.

Referring to FIG. 5, the induction heating apparatus 10 in one embodiment may include a rectifying circuit 202, smoothing circuits L1, C1, an inverter circuit 204, and a working coil 132.

The rectifying circuit 202 may include a plurality of diode elements D1, D2, D3, D4. The rectifying circuit 202 may be a bridge diode circuit, as illustrated in FIG. 5, and may be another circuit depending on embodiments. The rectifying circuit 202 may rectify AC voltage supplied by a power supplying device 20 and output voltage having a pulse waveform.

The smoothing circuits L1, C1 may smooth the voltage rectified by the rectifying circuit 202 and output DC link voltage. The smoothing circuits L1, C1 may include a first inductor L1 and a DC link capacitor C1.

The inverter circuit 204 may include a first switching element SW1, a second switching element SW2, a first capacitor C2, and a second capacitor C3.

As illustrated in FIG. 5, the inverter circuit 204 of the induction heating apparatus 10 in one embodiment may be implemented as a half-bridge circuit including two switching elements SW1, SW2. In another embodiment, the inverter circuit 204 may be implemented as a full-bridge circuit including four switching elements.

The first switching element SW1 and the second switching element SW2 may be respectively turned on and turned off by a first switching signal S1 and a second switching signal S2. For example, each of the switching elements SW1, SW2 may be turned on when each of the switching signals S1, S2 is at a high level, and turned off when each of the switching signals S1, S2 is at a low level.

In FIG. 5, each of the switching elements SW1, SW2 is an IGBT element, for example. However, each of the switching elements SW1, SW2 may be another type of switching element (e.g., a BJT or an FET and the like), depending on embodiments.

The switching elements SW1, SW2 may be turned on and turned off complementarily. For example, in any operation mode, the second switching element SW2 may be turned off (turned on) while the first switching element SW1 is turned on (turned off).

DC link voltage input to the inverter circuit 204 may be converted into alternating voltage (alternating current) as a result of the turn-on and turn-off operations, i.e., a switching operation, of the switching elements SW1, SW2 included in the inverter circuit 204. The alternating current output from the inverter circuit 204 may be supplied to the working coil 132. When the alternating current is supplied by the inverter circuit 204, a resonance phenomenon may occur in the working coil 132, and thermal energy may be supplied to the container.

In the disclosure, each of the first switching signal S1 and the second switching signal S2 may be a pulse width modulation (PWM) signal having a predetermined duty cycle.

When the alternating current output from the inverter circuit 204 is supplied to the working coil 132, the working coil 132 may be driven. As a result of the driving of the working coil 132, a container placed over the working coil 132 may be heated while eddy current flows in the container. During the driving of the working coil 132, magnitude of thermal energy supplied to the container may vary depending on magnitude of power actually generated as a result of the driving of the working coil, i.e., an actual output power value of the working coil.

When the induction heating apparatus 10 is powered on as a result of manipulation of the interface of the induction heating apparatus 10 by the user, the induction heating apparatus may be put on standby for driving as power is supplied to the induction heating apparatus from an input power supply 20. Then the user may place a container over a working coil of the induction heating apparatus and set a power level for the container, to give the working coil an instruction to initiate heating. When the instruction to initiate heating is given by the user, a power value required of the working coil 132, i.e., a required power value of the working coil 132 may be determined based on the power level set by the user.

Having received the user's instruction to initiate heating, the controller 2 may determine a driving frequency, corresponding to the required power value of the working coil 132, and supply a control signal corresponding to the determined driving frequency to the driving circuit 22. Accordingly, the switching signals S1, S2 may be output from the driving circuit 22, and as the switching signals S1, S2 are respectively input to the switching elements SW1, SW2, the working coil 132 may be driven. As a result of the driving of the working coil 132, the container may be heated while eddy current flows in the container.

In one embodiment, the controller 2 may determine a driving frequency of the working coil 132 such that the driving frequency corresponds to a power level of a heating zone, set by the user. For example, when the user sets a power level of a heating zone, the controller 2 may set a driving frequency of the working coil 132 to a predetermined maximum frequency, and then gradually decrease the driving frequency of the working coil 132 until an output power value of the working coil 132 matches a required power value corresponding to the power level set by the user. The controller 2 may determine a frequency at a time when the output power value of the working coil 132 matches the required power value as the driving frequency of the working coil 132.

The controller 2 may supply a control signal corresponding to the determined driving frequency to the driving circuit 22. The driving circuit 22 may output switching signals S1, S2 that have a duty ratio corresponding to the driving frequency determined by the controller 2, based on the control signal output from the controller 2. As a result of input of the switching signals S1, S2 alternating current may be supplied to the working coil 132 while the switching elements SW1, SW2 are turned on and turned off complementarily.

When the container is heated as a result of the driving of the working coil 132, the controller 2 may obtain magnitude of resonance current, i.e., a resonance current value, of the working coil 132, measured through a current sensor 24.

Further, the controller 2 may obtain magnitude of voltage, which is supplied to the switching elements SW1, SW2, and measured through a voltage sensor 26 when the switching elements SW1, SW2 are turned on and turned off complementarily, SW2, i.e., a driving voltage value that is magnitude of driving voltage of the switching elements SW1, SW2. For example, when the switching elements SW1, SW2 are an IGBT element, a driving voltage value of the switching elements SW1, SW2 may be magnitude of voltage between a second terminal (a collector terminal) and a third terminal (an emitter terminal), among a first terminal (a base terminal), the second terminal (a collector terminal) and the third terminal (an emitter terminal) included in the IGBT element, i.e., magnitude of collector-emitter voltage $V_{CE}$.

FIG. 5 shows an embodiment in which the voltage sensor 26 measures a driving voltage value of the switching element SW2. However, a driving voltage value of the switching element SW1 may be measured depending on embodiments.

In one embodiment, the controller 2 may compare the resonance current value obtained through the current sensor 24 with the driving voltage value of the switching element obtained through the voltage sensor 26, and generate an overlapped period.

Figure 6:
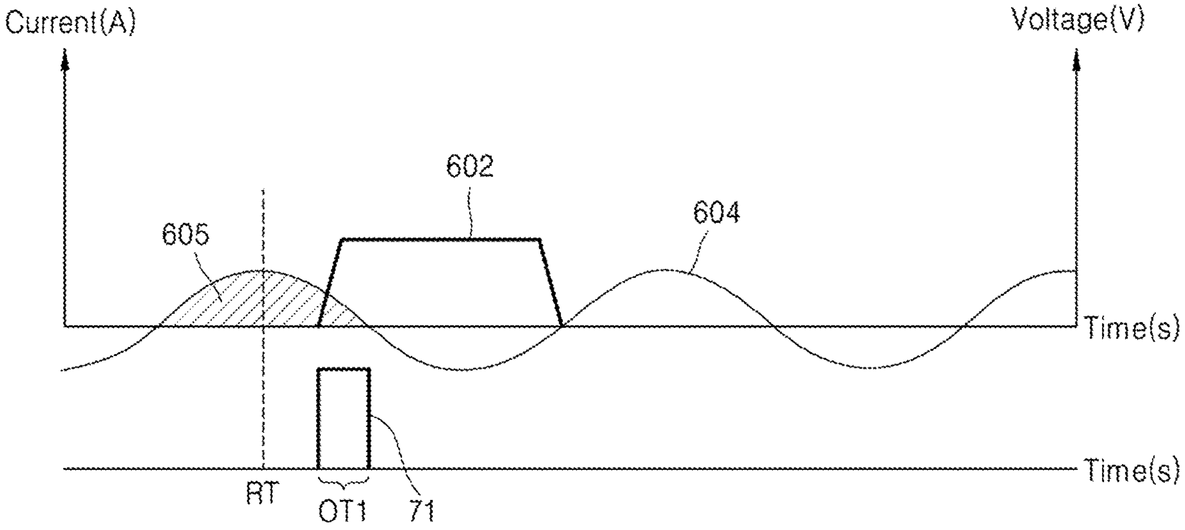
FIG. 6 is a view showing a waveform of resonance current of a working coil and a waveform of driving voltage of a switching element when an induction heating apparatus is driven in an inductive area.
Figure 7:
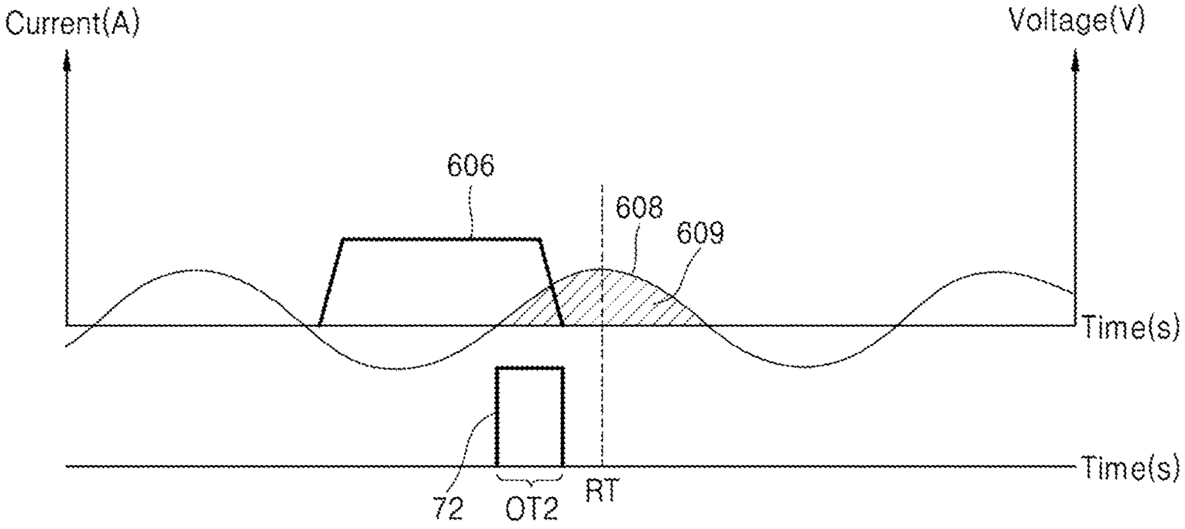
FIG. 7 is a view showing a waveform of resonance current of a working coil and a waveform of driving voltage of a switching element when an induction heating apparatus is driven in a capacitive area.

FIG. 6 is a view showing a waveform of resonance current of a working coil and a waveform of driving voltage of a switching element when an induction heating apparatus is driven in an inductive area, and FIG. 7 is a view showing a waveform of resonance current of a working coil and a waveform of driving voltage of a switching element when an induction heating apparatus is driven in a capacitive area.

In one embodiment, when the container is heated as a result of the driving of the working coil 132, the controller 2 may respectively obtain a resonance current value 604, 608 of the working coil 132 and a driving voltage value 602, 606 of the switching element SW2, as illustrated in FIGS. 6 and 7.

The controller 2 may compare the obtained resonance current value 604, 608 of the working coil 132 with the obtained driving voltage value 602, 606 of the switching element SW2, and generate a period for which the resonance current value 604, 608 of the working coil 132 and the driving voltage value 602, 606 of the switching element SW2 are all positive numbers, i.e., an overlapped period. In FIGS. 6 and 7, the overlapped periods 71, 72 that are the periods, for which the resonance current value 604, 608 of the working coil 132 and the driving voltage value 602, 606 of the switching element SW2 are all positive numbers, are illustrated respectively.

When the overlapped periods 71, 72 are obtained, the controller 2 may compare a time point at which the overlapped periods 71, 72 appear with a predetermined reference time point.

In the disclosure, the reference time point may be defined as a middle time point of the period for which the resonance current value of the working coil is positive numbers. For example, in FIG. 6, a middle time point RT of the period 605 for which the resonance current value 604 of the working coil 132 is positive numbers may be a reference time point. Likewise, in FIG. 7, a middle time point RT of the period 609 for which the resonance current value 608 of the working coil 132 is positive numbers may be a reference time point.

Figure 2:
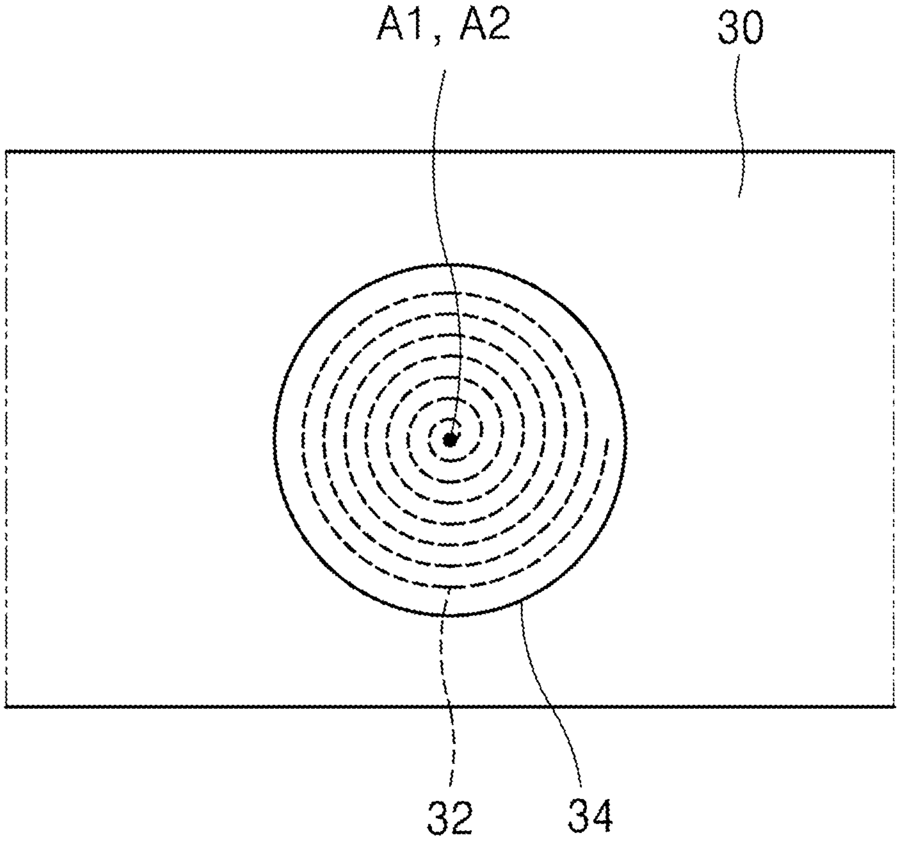
FIG. 2 is a view showing a state in which a container is normally placed in a heating zone formed on an upper plate of an induction heating apparatus.

As illustrated in FIG. 6, when the induction heating apparatus is driven in the inductive area, i.e., when the induction heating apparatus is driven normally, a time point OT1 at which the overlapped period 71 appears may be later than the reference time point, i.e., the middle time point RT. When the container is not moved in a state of being eccentric (see FIG. 1) or in a state of being concentric (see FIG. 2) and the working coil 132 is driven, the induction heating apparatus may be driven in the inductive area.

When the induction heating apparatus is driven in the capacitive area as illustrated in FIG. 7, i.e., when the induction heating apparatus is driven abnormally, a time point OT2 at which the overlapped period 72 appears may be earlier than the reference time point, i.e., the middle time point RT. When the container is in a state of being eccentric (see FIG. 1) and then goes into a state of being concentric (see FIG. 2) during the driving of the working coil 132, as described above, the induction heating apparatus may be driven in the capacitive area.

Accordingly, the controller 2 may compare the time point at which the overlapped period, generated during the driving of the working coil 132, appears with the reference time point, to determine a driving state of the induction heating apparatus. In one embodiment, when the time point at which the overlapped period appears is later than the reference time point, the controller 2 may determine that the driving state of the induction heating apparatus is normal, and when the time point at which the overlapped period appears is earlier than the reference time point, determine that the driving state of the induction heating apparatus is abnormal.

The controller 2 may determine whether the working coil 132 is driven, based on the overlapped period and the driving state of the induction heating apparatus. For example, when determining that the driving state of the induction heating apparatus is normal, the controller 2 may keep the working coil 132 operating.

However, when determining that the driving state of the induction heating apparatus is abnormal, the controller 2 may stop the driving of the working coil 132. Thus, the switching elements SW1, SW2 included in the inverter circuit 204 may be prevented from being burnt out.

In one embodiment, after the working coil 132 stops operating since the controller determines that the driving state of the induction heating apparatus is abnormal, the controller 2 may calculate a driving frequency for driving the working coil 132 again, i.e., a re-driving frequency, based on a required power value set by the user.

Figure 3:
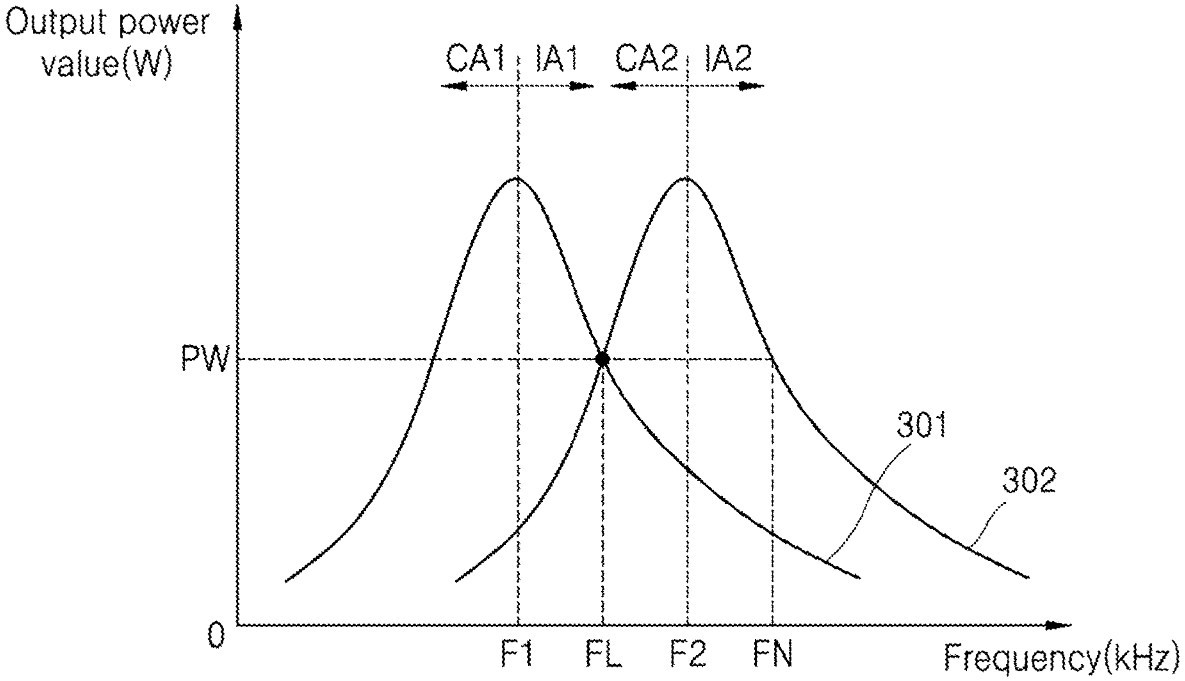
FIG. 3 is a view showing frequency-output power value curves when a container is placed in a heating zone abnormally and normally.

For example, as illustrated in FIG. 3, after the working coil 132 stops operating since the controller determines that the driving state of the induction heating apparatus is abnormal while the working coil 132 is being driven at a driving frequency FL, the controller 2 may detect a re-driving frequency FN of the working coil 132, corresponding to the required power value PW. The controller 2 may drive the working coil 132 again, based on the re-driving frequency FN, such that the working coil 132 starts to heat the container again. Since the re-driving frequency FN of the working coil 132 is greater than a resonance frequency F2 as illustrated in FIG. 3, the induction heating apparatus may be driven reliably in the inductive area.

Figure 8:
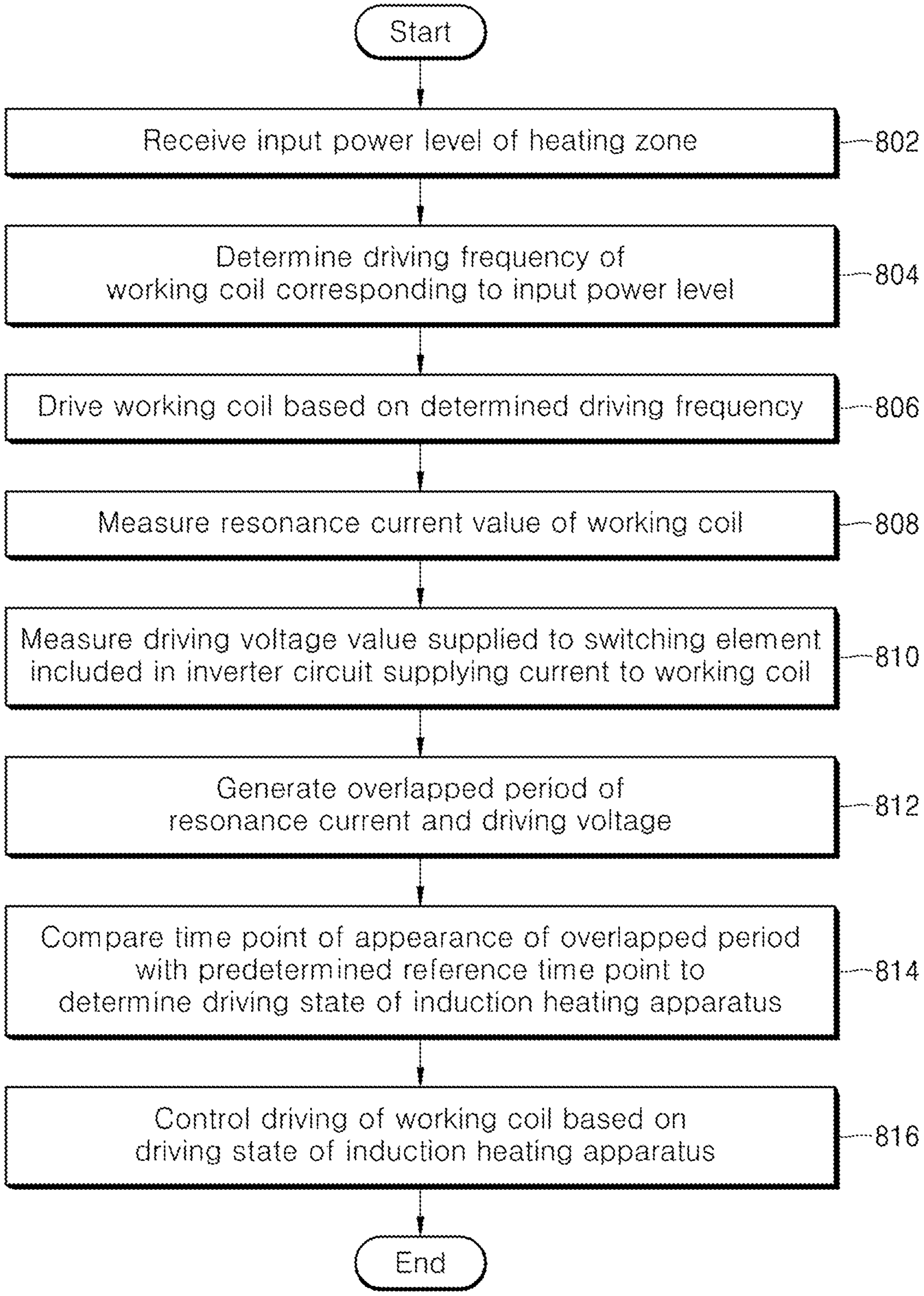
FIG. 8 is a flow chart showing a method for controlling an induction heating apparatus in one embodiment.

FIG. 8 is a flow chart showing a method for controlling an induction heating apparatus in one embodiment.

Referring to FIG. 8, a controller 2 may receive an input power level of a heating zone (802). The controller 2 may determine a driving frequency of a working coil 132, corresponding to the input power level (804).

When the driving frequency of the working coil 132 is determined, the controller 2 may supply a control signal to a driving circuit 22 to drive the working coil 132 based on the driving frequency (806).

While the working coil 132 is being driven, the controller 2 may measure a resonance current value of the working coil 132 (808). Further, while the working coil 132 is being driven, the controller 2 may measure a driving voltage value supplied to a switching element (e.g., SW2) included in an inverter circuit 204 configured to supply current to the working coil 132 (810).

The controller 2 may generate an overlapped period of the resonance current value and the driving voltage value (812).

The controller 2 may compare a time point at which the overlapped period appears with a predetermined reference time point to determine a driving state of the induction heating apparatus (814). In one embodiment, when the time point at which the overlapped period appears is later than the reference time point, the controller 2 may determine the driving state of the induction heating apparatus is normal, and when the time point at which the overlapped period appears is earlier than the reference time point, determine the driving state of the induction heating apparatus is abnormal.

The controller 2 may control the driving of the working coil, based on the determined driving state of the induction heating apparatus (816). In one embodiment, when determining that the driving state of the induction heating apparatus is normal, the controller 2 may keep the working coil 132 operating. When determining that the driving state of the induction heating apparatus is abnormal, the controller 2 may stop the driving of the working coil 132.

Though not illustrated, the method for controlling an induction heating apparatus in one embodiment may further include determining a re-driving frequency of the working coil 132, corresponding to the power level, after stopping the driving of the working coil 132, and driving the working coil 132 at the re-driving frequency.

Figure 9:
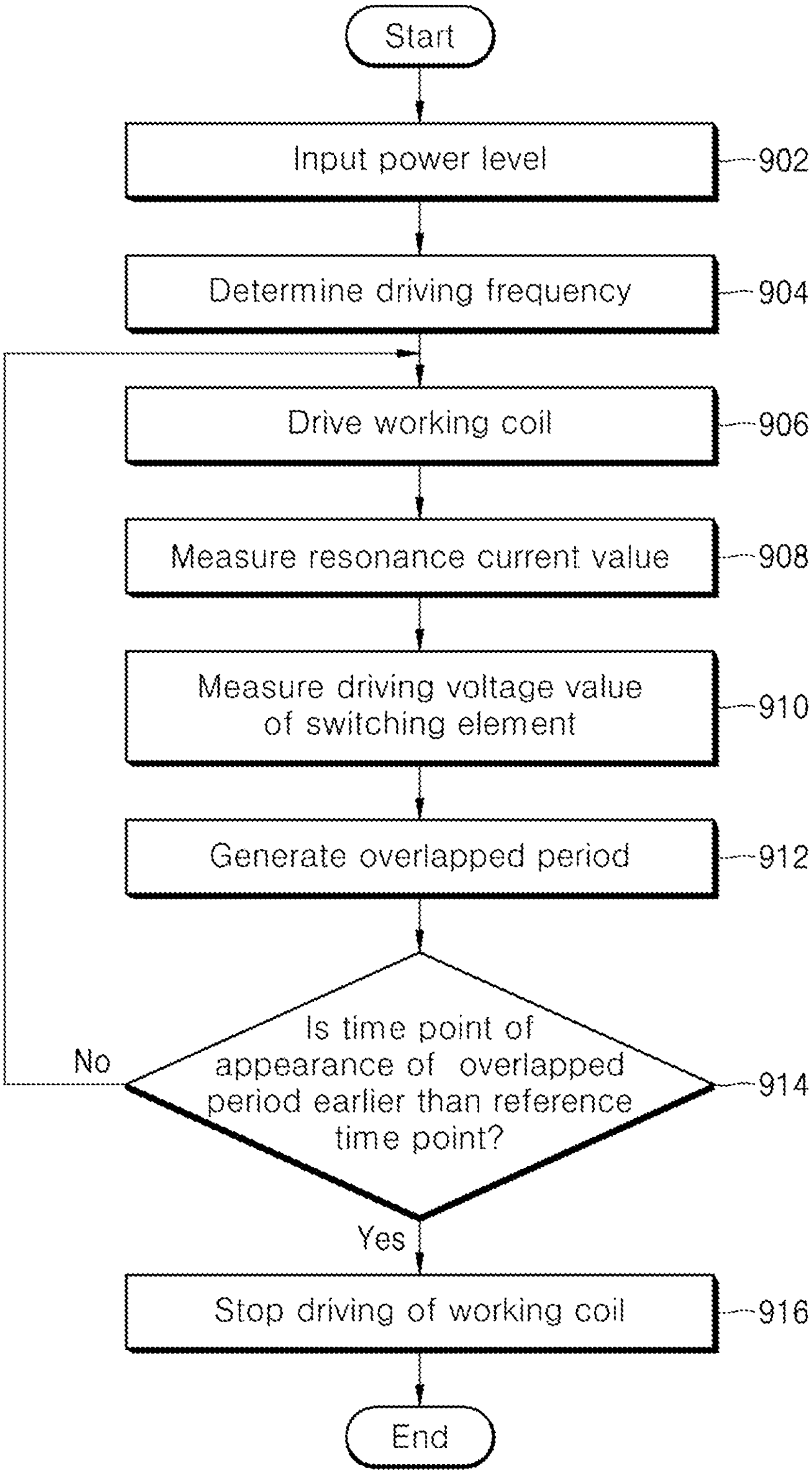
FIG. 9 is a flow chart showing a method for controlling an induction heating apparatus in another embodiment.

FIG. 9 is a flow chart showing a method for controlling an induction heating apparatus in another embodiment.

When a user places a container in a heating zone and inputs a power level (902), a controller 2 may determine a driving frequency of a working coil 132, corresponding to the power level (904).

When the driving frequency is determined, the controller 2 may supply a control signal corresponding to the driving frequency to a driving circuit 22. Accordingly, the working coil 132 may be driven at the driving frequency (906).

When the working coil 132 is driven at the driving frequency, the controller 2 may obtain a resonance current value of the working coil 132 measured through a current sensor 24 (908). Further, the controller 2 may obtain a driving voltage value of a switching element SW2, measured through a voltage sensor 26 when the working coil 132 is driven (910).

The controller 2 may generate an overlapped period of resonance current value of the working coil 132 and the driving voltage value of the switching element SW2 (912).

The controller 2 may compare a time point at which the overlapped period generated appears with a predetermined reference time point (914).

When the time point at which the overlapped period appears is later than the reference time point as a result of the comparison in step 914, it means that the induction heating apparatus is driven in an inductive area. Accordingly, the controller 2 may determine that a driving state of the induction heating apparatus is normal.

When determining that the driving state of the induction heating apparatus is normal, the controller 2 may perform step 906 to step 914 again.

When the time point at which the overlapped period appears is earlier than the reference time point as a result of the comparison in step 914, it means that the induction heating apparatus is driven in a capacitive area. Accordingly, the controller 2 may determine that the driving state of the induction heating apparatus is abnormal.

When determining that the driving state of the induction heating apparatus is abnormal, the controller 2 may stop the driving of the working coil 132 (916). Thus, the switching elements SW1, SW2 may be prevented from being burnt out.

Though not illustrated, the controller 2 may determine a re-driving frequency of the working coil 132, corresponding to a required power value, after stopping the driving of the working coil 132 in step 916, and driving the working coil 132 at the re-driving frequency. Thus, even after the user moves the container, the switching elements SW1, SW2 may be prevented from being burnt out, and an operation of heating the container may continue.

The objective of the present disclosure is to prevent a switching element from being burnt out by stopping operation of an induction heating apparatus when the induction heating apparatus is sensed operating abnormally due to a change in the position of a container during normal operation of the induction heating apparatus.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

A controller of an induction heating apparatus in one embodiment may generate an overlapped period of a resonance current value of a working coil, and a driving voltage value of a switching element included in an inverter circuit. In the present disclosure, the overlapped period may be a period for which the resonance current value and the driving voltage value are all positive numbers.

The controller may determine whether a driving state of the induction heating apparatus is abnormal, based on a time point of appearance of the overlapped period.

In the disclosure, the abnormal driving state of the induction heating apparatus denotes driving of the induction heating apparatus in a capacitive area. Additionally, in the disclosure, the normal driving state of the induction heating apparatus denotes driving of the induction heating apparatus in an inductive area.

When determining that the driving state of the induction heating apparatus is abnormal, the controller may stop the driving of the working coil. When the induction heating apparatus operates in the capacitive area, the switching element is likely to be burnt out. The driving of the working coil may stop to prevent the switching element from being burnt out.

The induction heating apparatus in one embodiment may include a working coil disposed in a position corresponding to a position of a heating zone, an inverter circuit including a plurality of switching elements and configured to supply current to the working coil, a driving circuit configured to supply a switching signal to each of the switching elements included in the inverter circuit, and a controller configured to determine a driving frequency of the working coil, corresponding to a power level of the heating zone, when the power level is input, supply a control signal based on the driving frequency to the driving circuit, and drive the working coil.

In one embodiment, the controller may measure a resonance current value of the working coil, measure a driving voltage value supplied to the switching element included in the inverter circuit configured to supply current to the working coil, generate an overlapped period of the resonance current and the driving voltage, compare a time point of appearance of the overlapped period with a predetermine reference time point to determine a driving state of the induction heating apparatus, and control driving of the working coil based on the driving state of the induction heating apparatus.

A method for controlling an induction heating apparatus in one embodiment may include receiving an input power level of a heating zone, determining a driving frequency of a working coil, corresponding to the power level, driving the working coil based on the driving frequency, measuring a resonance current value of the working coil, measuring a driving voltage value supplied to a switching element included in an inverter circuit configured to supply current to the working coil, generating an overlapped period of the resonance current and the driving voltage, comparing a time point of appearance of the overlapped period with a predetermined reference time point to determine a driving state of the induction heating apparatus, and controlling driving of the working coil based on the driving state of the induction heating apparatus.

In one embodiment, when an induction heating apparatus is sensed operate abnormally due to a change in the position of a container during normal operation of the induction heating apparatus, the induction heating apparatus stops operating. Thus, the burning out of switching elements are prevented, which would be caused when the induction heating apparatus continues to operate abnormally.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being “on” another element or layer, the element or layer can be directly on another element or layer or intervening elements or layers. In contrast, when an element is referred to as being “directly on” another element or layer, there are no intervening elements or layers present. As used herein, the term “and/or” includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus, comprising:
- a working coil disposed to correspond to a heating zone;
- an inverter circuit that includes a plurality of switching elements and configured to supply current to the working coil;
- a driving circuit configured to supply a switching signal to each of the switching elements; and
- a controller configured to:
  - determine a driving frequency of the working coil, corresponding to an input power level of the heating zone,
  - provide a control signal cy to the driving circuit based on the driving frequency, and drive the working coil,
  - wherein the controller receives a resonance current value of the working coil, receives a driving voltage value provided to one of the switching elements, determines an overlapped period of the resonance current value and the driving voltage value, compares a time of the overlapped period with a predetermined reference time to determine a driving state of the induction heating apparatus, and controls driving of the working coil based on the determined driving state.

2. The induction heating apparatus of claim 1, wherein the overlapped period is a time period when the resonance current value is a positive value and the driving voltage value is a positive value.

3. The induction heating apparatus of claim 1, wherein the driving voltage value is magnitude of voltage provided between two terminals of the switching element.

4. The induction heating apparatus of claim 1, wherein the reference time corresponds to a period in which the resonance current value is positive.

5. The induction heating apparatus of claim 1, wherein when the time of the overlapped period is after the reference time, the controller determines that the driving state of the induction heating apparatus is normal, and
- when the time of the overlapped period is earlier than the reference time, the controller determines that the driving state of the induction heating apparatus is abnormal.

6. The induction heating apparatus of claim 1, wherein when the driving state of the induction heating apparatus is determined to be normal, the controller maintains driving of the working coil, and
- when the driving state of the induction heating apparatus is determined to be abnormal, the controller stops driving of the working coil.

7. The induction heating apparatus of claim 6, wherein after the induction heating apparatus is determined to be abnormal, the controller determines a re-driving frequency of the working coil, corresponding to the input power level, and drives the working coil based on the re-driving frequency.

8. A method for controlling an induction heating apparatus, comprising:
- receiving an input power level for a heating zone;
- determining a driving frequency of a working coil based on the power level;
- driving the working coil based on the driving frequency;
- determining a resonance current value of the working coil;

determining a driving voltage value provided to a switching element of an inverter circuit configured to supply current to the working coil;

determining an overlapped period of the resonance current value and the driving voltage value;

comparing a time of the overlapped period with a predetermined reference time in order to determine a driving state of the induction heating apparatus; and controlling driving of the working coil based on the determined driving state.

9. The method of claim 8, wherein the overlapped period is a time period f when the resonance current value is a positive value and the driving voltage value is a positive value.

10. The method of claim 8, wherein the driving voltage value is magnitude of voltage provided between two terminals of the switching element.

11. The method of claim 8, wherein the reference time corresponds to a period in which the resonance current value is positive.

12. The method of claim 8, wherein the determining of the driving state of the induction heating apparatus includes:

determining that the driving state is normal when the time of the overlapped period is after the reference time; and determining that the driving state is abnormal when the time of the overlapped period is earlier than the reference time t.

13. The method of claim 8, wherein the controlling of the driving of the working coil includes:

maintaining driving of the working coil when the driving state is determined to be normal; and stopping driving of the working coil when the driving state is determined to be abnormal.

14. The method of claim 13, wherein the controlling of the driving of the working coil includes:

when the driving state is determined to be abnormal, determining a re-driving frequency of the working coil corresponding to the input power level; and driving the working coil based on the re-driving frequency.

15. An induction heating apparatus, comprising:

a working coil;

a circuit configured to supply current to the working coil, the circuit including a plurality of switching elements;

a driving circuit configured to supply a switching signal to each of the switching elements; and a controller configured to:

determine a driving frequency of the working coil based on an input power level, provide a control signal to the driving circuit based on the driving frequency, and drive the working coil, wherein the controller receives a resonance current value of the working coil, receives a driving voltage value supplied to one of the switching elements, determines a driving state of the induction heating apparatus based on the resonance current value, the driving voltage value and a predetermined time, and controls driving of the working coil based on the determined driving state.

16. The induction heating apparatus of claim 15, wherein the driving voltage value is magnitude of voltage provided between two terminals of the switching element.

17. The induction heating apparatus of claim 15, wherein the predetermined time corresponds to a period in which the resonance current value is positive.

18. The induction heating apparatus of claim 15, wherein when an overlapped period of the resonance current value and the driving voltage value is after the predetermined time, the controller determines that the driving state is normal, and when the overlapped period is earlier than the predetermined time, the controller determines that the driving state is abnormal.

19. The induction heating apparatus of claim 18, wherein when the driving state is determined to be normal, the controller maintains driving of the working coil, and when the driving state is determined to be abnormal, the controller stops driving of the working coil.

20. The induction heating apparatus of claim 19, wherein after the driving state is determined to be abnormal, the controller determines a re-driving frequency of the working coil, corresponding to the input power level, and drives the working coil based on the re-driving frequency.

* * * * *